United States Patent Office 3,284,512
Patented Nov. 8, 1966

3,284,512
PREPARATION OF TRIBROMOBISPHENOL A
Henry E. Hennis and Leonard R. Thompson, Midland, Mich., assignors to The Dow Chemical Company, Midland, Mich., a corporation of Delaware
No Drawing. Filed Oct. 2, 1963, Ser. No. 313,178
3 Claims. (Cl. 260—619)

This invention relates to a new chemical process useful in making a brominated bisphenol not heretofore isolated and identified.

Tetrabromobisphenol A [4,4'-isopropylidenebis(2,6-dibromophenol)] is increasingly used as a starting material for making fire-retardant polyesters and epoxy resins. For such applications, it is particularly advantageous to have this relatively expensive brominated bisphenol available as a pure compound containing the theoretical amount of bromine. Various bromination methods have been developed as a result of efforts to reach this objective. This work has been hampered by a persistent reluctance of the bisphenol molecule to react with the last few remnants of the theoretical quantity of bromine and slightly underbrominated products have been the rule rather than the exception. In order to understand the nature of the problem and thereby to proceed toward its solution, it is necessary to know the identity of the underbrominated impurity and the reason for its presence.

In the past, speculation on the identity of the impurity has included the symmetrical dibromobisphenol which is known to exist and the possibility of a tribromobisphenol. The formation of an unsymmetrical tribrominated product in the process has been regarded with some doubt because of the equal reactivity of the two phenyl groups in the bisphenol molecule. Positive identification of the impurity has not been possible because the impurity has not been isolated and no one has heretofore prepared and isolated a tribromobisphenol A which could be used as a comparative standard.

A method has now been found whereby 2,2',6-tribromo-4,4'-isopropylidenediphenol, hereinafter referred to as tribromobisphenol A, can be prepared and isolated as a pure compound. By using this compound as a standard for analytical comparison, it has been found that the main phenolic impurity in tetrabrominated bisphenol A is indeed this tribromo compound.

This preparative method comprises reacting bisphenol A with a total of about 2.8 to about 3.7 moles of bromine under conditions such that the final brominated reaction product is a homogeneous solution in a solvent consisting essentially of 90-100% by volume of a lower primary alkanol and 0-10% of water. It has been found that addition of water to this product solution causes a fractional crystallization of most of the tetrabromobisphenol A from the phenolic product, whereupon the phenolic mother liquor then yields a second crop of crystals which is the desired tribrominated compound rather than the second crop of the tetrabromobisphenol A which normally would be expected.

The incompletely brominated bisphenol A solution can be made up by various methods. For example, dibromobisphenol A can be dissolved in a solvent as described above and brominated with 0.8-1.7 moles of bromine. A more convenient method is to brominate bisphenol A in the alkanolic solvent described with 2.8-3.7 moles of bromine at a temperature within the range conventionally used for this reaction, i.e., about 0-50° C. Bromine chloride gives equivalent results when used in place of bromine in the reaction. Best yields of tribromobisphenol A are obtained when 3.0-3.5 moles of bromine or bromine chloride are reacted with a mole of the bisphenol.

The alkanols suitable for use as solvents for the process are the lower primary alkanols which are miscible with water, that is, methyl, ethyl, and n-propyl alcohols. Isopropyl alcohol reacts during the bromination to form the bromide to too great an extent and the delicate solvent balance necessary for success is thereby upset. Up to 10% by volume of water may be used in the solvent. Ordinary 95% ethyl alcohol of any suitable denatured grade is preferred.

It is necessary to add to the brominated solution at least enough water to separate substantially all of the alkanol from the phenolic portion of the mixture. At least about 0.5 part by weight of total water per part of alkanol solvent is needed to accomplish this and preferably an excess over this minimum quantity is used.

After removal of the solid tetrabromobisphenol A which separates upon dilution of the brominated solution with water, the tribromobisphenol A separates from the liquid mother liquor very slowly. Upon standing at about the reaction temperature of 0-50° C., and preferably at 15-35° C., no substantial quantity of tribromobisphenol A is usually obtained in less than about one month. Crystallization is essentially complete under these conditions in about three months. Seeding of the mother liquor with crystals of the pure product shortens the crystallization time to some extent.

Example 1

A solution of 344 g. (1.5 g. mole) of bisphenol A in 508 g. of 2B 95% ethyl alcohol was made up in a 2 l. reactor flask equipped with stirrer, thermometer, dropping funnel, and reflux condenser. To this solution, 726 g. (4.5 g. mole) of bromine was added dropwise in 1.75 hrs. at 24–26° C. At the end of the reaction period, 406 g. of water was added to the mixture and stirring was continued for another 30 minutes. A heavy phenolic phase consisting of a solid and a viscous oil formed during the water addition. The solid portion was filtered off and washed with 130 g. of water. After drying, it amounted to 258 g. and it was identified as a technical grade of tetrabromobisphenol A. The water wash was combined with the total filtrate and the viscous oil layer was separated from the aqueous ethanol phase and set aside to stand at room temperature. After one month's standing, it was observed that crystals were beginning to form in the oil. No substantial further crystallization took place after about three months. The crystals were separated at the end of each month and recrystallized from a chloroform-petroleum ether solvent. A total yield of 79.3 g. of light tan recrystallized product was obtained. These crystals melted at 109–112° C. and were found by elemental analysis and other investigation detailed below to be 2,2',6-tribromo-4,4'-isopropylidenediphenol and not the expected second crop of tetrabromobisphenol A. Elemental analysis showed 39.21% C, 3.13% H, and 51.21% Br; calculated for the tribromo compound, 38.75% C, 2.82% H, 51.5% Br. The diacetate was prepared by conventional esterification with acetic anhydride and p-toluenesulfonic acid catalyst. The recrystallized diester melted at 99–100° C. and elemental analysis was consistent with the postulated structure. As a further proof of structure, a sample of the tribromobisphenol A was reacted with a molar equivalent of bromine to obtain authentic tetrabromobisphenol A.

Example 2 illustrates the effect of utilizing too little bromine in the bromination step.

Example 2

By the procedure described in Example 1, 1.5 g. mole of bisphenol A was reacted with 3.75 g. moles of bromine, a molar ratio of 2.5/1 of bromine to bisphenol. The reaction product was treated with the same proportion of water used before and 93 g. of solid tetrabromobisphenol A was thereby obtained. Crystallization from the phenolic mother liquor yielded only dibromobisphenol A. No tribrominated product could be isolated.

A somewhat higher degree of bromination than shown in Example 1 will produce the tribromo compound but in reduced yield. Example 3 shows such a result.

*Example 3*

Using the same procedure, 1.5 g. mole of bisphenol A was reacted with 5.25 g. moles of bromine, a molar ratio of bromine to bisphenol of 3.5/1. A total of 592 g. of solid tetrabromobisphenol A was obtained from the reaction mixture. From the phenolic mother liquor, 31 g. of tribromobisphenol A had crystallized and was separated after a month's standing at room temperature.

Examples 4–6 show the negative results obtained when operating under conditions somewhat similar to but outside the scope of the present process.

*Example 4*

A run was made as in Example 1 except that the bisphenol was brominated in a solvent consisting of 508 g. of 95% ethyl alcohol and 406 g. of water. Solid tetrabromobisphenol A separated from the reaction solution as the bromination progressed. After separation of this solid from the reaction mixture, the oily phenolic mother liquor yielded only 18 g. of additional tetrabromobisphenol A which crystallized out, on standing. No tribrominated product was isolated.

*Examples 5–6*

Runs made as in Examples 1 and 4 using acetic acid in each run in place of ethyl alcohol failed to show the fractional crystallization of tetrabromobisphenol A which is essential to success of the process. No tribromobisphenol A could be separated from either product.

By substituting methyl alcohol or n-propyl alcohol for the ethyl alcohol employed in Examples 1 and 3, tribromobisphenol A is obtained in yields comparable to those shown therein.

In addition to its utility as an analytical standard, tribromobisphenol A has valuable bacteriostatic and fungicidal properties. Concentrations of this compound as low as 0.05% are effective in inhibiting the growth of common harmful microbial organisms.

We claim:
1. A process for making 2,2',6-tribromo-4,4'-isopropylidenephenol which comprises reacting by contacting a solution of one mole of p,p'-isopropylidenediphenol in a solvent consisting essentially of 90–100% by volume of a primary alkanol of 1–3 carbon atoms and 10–0% of water with about 2.8 to about 3.7 moles of a brominating agent selected from the group consisting of bromine and bromine chloride at about 0° C. to about 50° C., mixing the reacted solution with sufficient water to provide a total of at least about 0.5 part by volume of water per part of alkanol, thereby forming an aqueous phase and a phenolic phase, said phenolic phase consisting of a mixture of liquid and solid, separating said liquid phenolic phase and crystallizing 2,2',6-tribromo-4,4'-isopropylidenediphenol from said liquid phenolic phase at 0–50° C.

2. The process of claim 1 wherein the solvent is ethyl alcohol containing about 5% by volume of water and the brominating agent is bromine.

3. A process for making 2,2',6-tribromo-4,4'-isopropylidenediphenol which comprises reacting by contacting a solution of a mole of 4,4'-isopropylidenebis(2-bromophenol) in a solvent consisting essentially of 90–100% by volume of a primary alkanol of 1–3 carbon atoms and 10–0% of water with about 0.8 to about 1.7 moles of a brominating agent selected from the group consisting of bromine and bromine chloride at about 0° C. to about 50° C., mixing the reacted solution with sufficient water to provide a total of at least about 0.5 part by volume of water per part of alkanol, thereby forming an aqueous phase and a phenolic phase, said phenolic phase consisting of a mixture of liquid and solid, separating said liquid phenolic phase, and crystallizing 2,2',6-tribromo-4,4'-isopropylidenediphenol from said liquid phenolic phase at 0°–50° C.

References Cited by the Examiner

UNITED STATES PATENTS 3,029,291 4/1962 Dietzler _____ 260—619
3,035,098 5/1962 Bryner _____ 260—619

LEON ZITVER, *Primary Examiner.*

D. M. HELFER, *Assistant Examiner.*